United States Patent [19]

Tagami

[11] Patent Number: 4,697,824
[45] Date of Patent: Oct. 6, 1987

[54] DAMPING FORCE CONTROL DEVICE FOR VEHICLE DAMPER

[75] Inventor: Tomoyuki Tagami, Saitama, Japan

[73] Assignee: Honda Giken Kogyo Kabushiki Kaisha, Tokyo, Japan

[21] Appl. No.: 801,144

[22] Filed: Nov. 22, 1985

[30] Foreign Application Priority Data

Nov. 22, 1984 [JP] Japan .................................. 59-247624
Nov. 22, 1984 [JP] Japan .................................. 59-247625

[51] Int. Cl.$^4$ ............................ F16F 9/44; B60G 3/14
[52] U.S. Cl. ..................................... 280/701; 188/319; 280/284; 280/707
[58] Field of Search .................... 280/113, 112 A, 115, 280/701, 702, 125, 707, 283, 294, 288; 188/319, 300; 267/64.12

[56] References Cited

U.S. PATENT DOCUMENTS

| 1,700,044 | 1/1929 | Hales | 188/319 |
| 4,145,073 | 3/1979 | McLuckie et al. | 280/702 |
| 4,220,228 | 9/1980 | Kato | 188/319 |
| 4,230,341 | 10/1980 | Hart et al. | 280/702 |
| 4,463,839 | 8/1984 | Ashiba | 188/319 |
| 4,535,877 | 8/1985 | Shimokura | 188/319 |

Primary Examiner—Richard A. Bertsch
Attorney, Agent, or Firm—Lyon & Lyon

[57] ABSTRACT

A damper is interposed between a body of a vehicle and a wheel support arm adapted to support a wheel and mounted swingingly on the body, and a control device is operatively connected to a damping force generating device mounted to the damper for controlling the increase and decrease of a damping force of the damping force generating device in response to the swing motion of the wheel support arm. Therby a more effective damping function is exhibited to improve a riding comfort.

4 Claims, 11 Drawing Figures

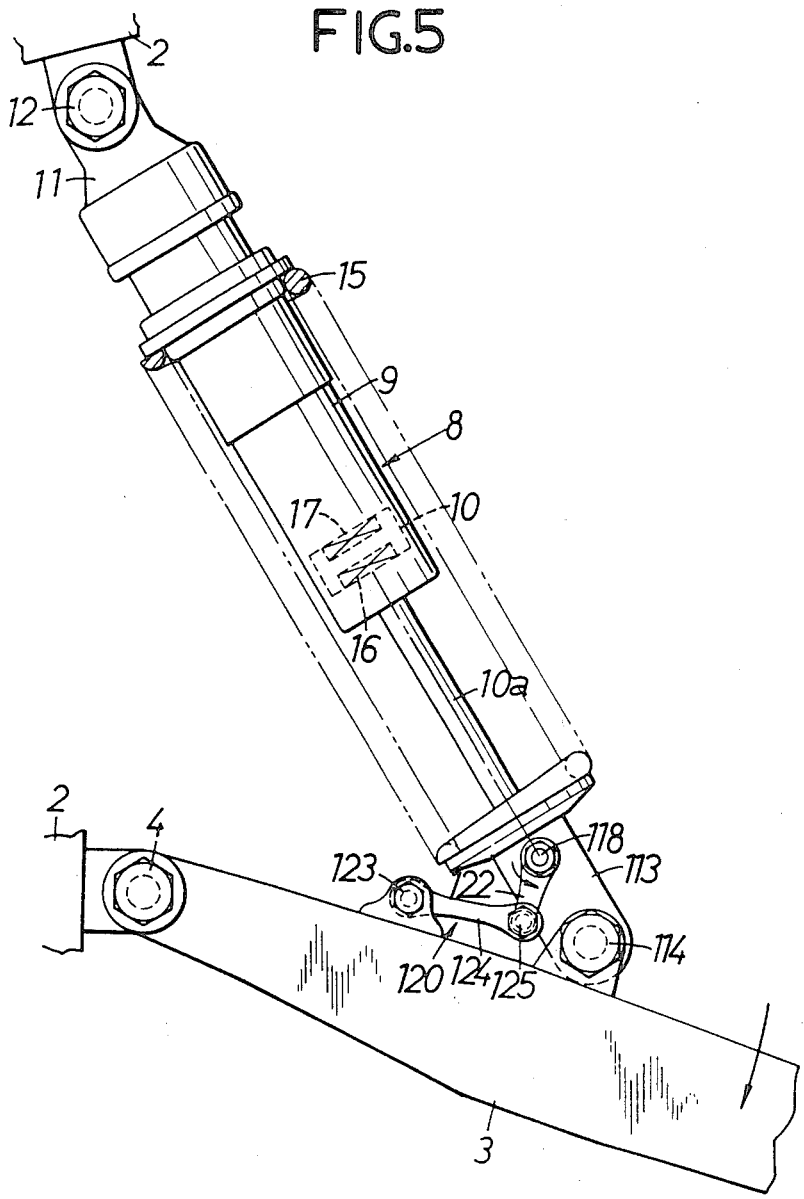

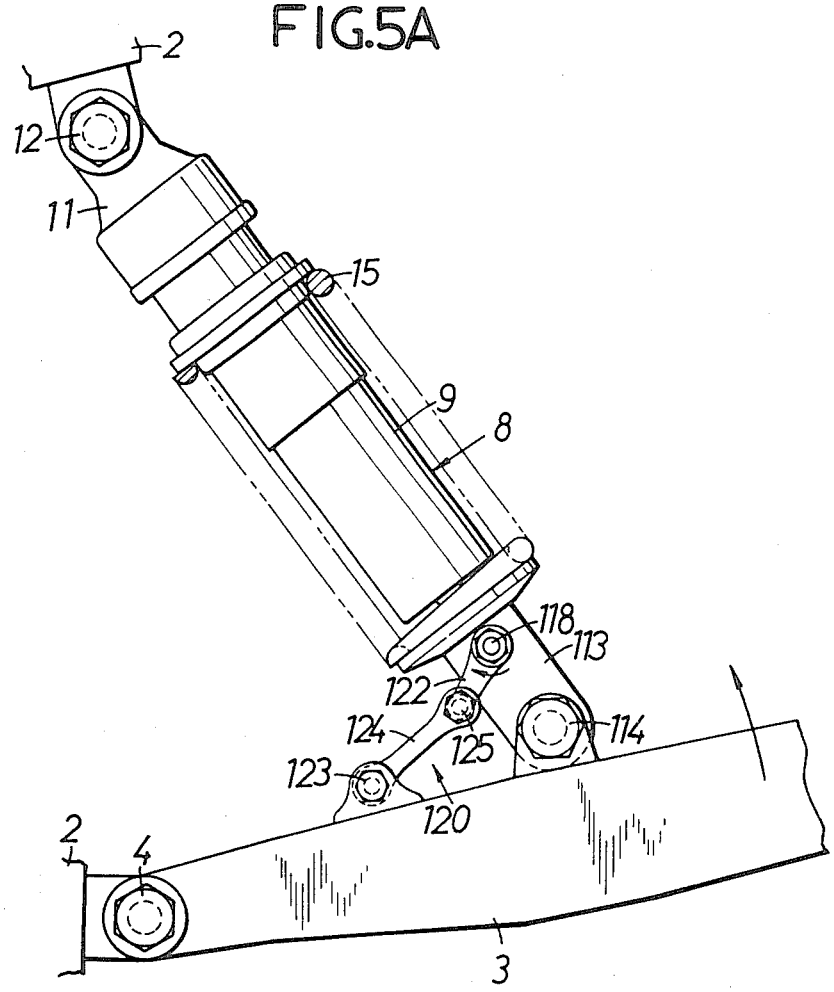

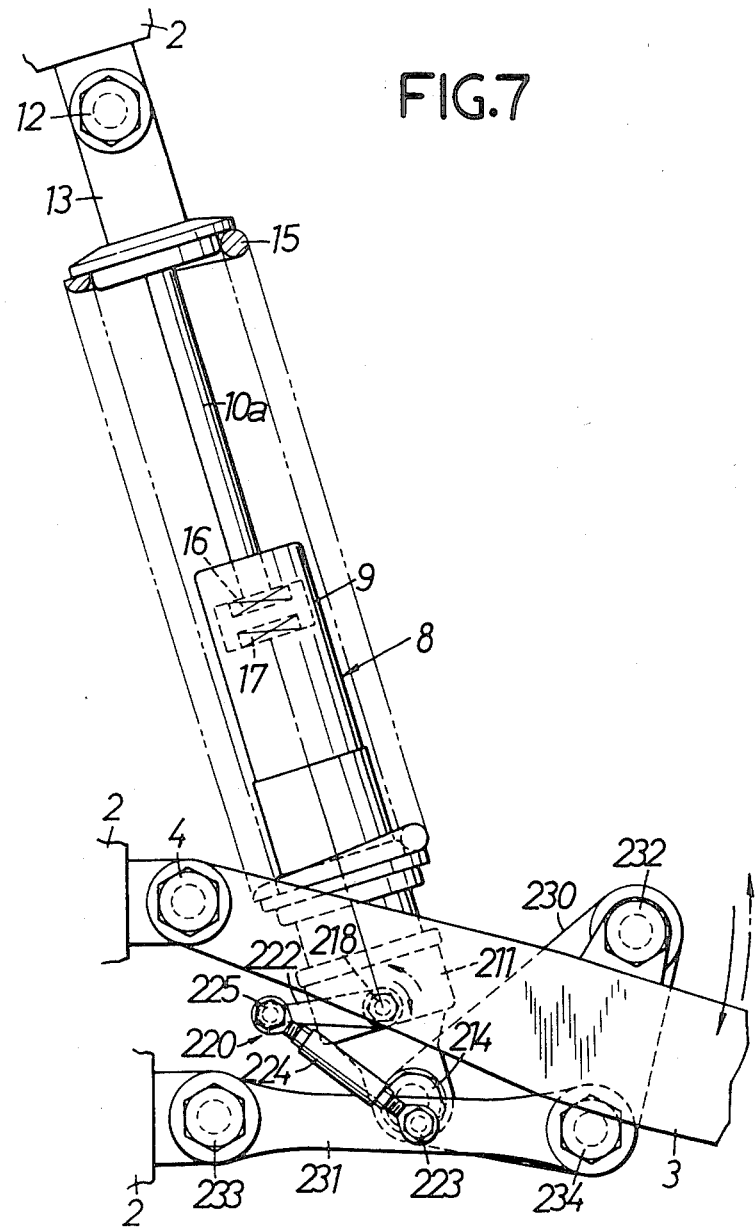

DAMPING FORCE CONTROL DEVICE FOR VEHICLE DAMPER

BACKGROUND OF THE INVENTION

1. Field of the Invention

The present invention relates to a damping force control device for a vehicle damper, the damper being of a type interposed between a vehicle body and a wheel support arm supported swingingly up and down on the body to support a wheel, the damper encasing a damping force generating device therein.

2. Description of the Prior Art

In the past, a hydraulic damper provided with a variable damping force generating device capable of adjusting a damping force to be generated has already been known, for example, as disclosed in Japanese Utility Model Publication No. 32,971/83.

With latest increased demand for giving occupants a better riding comfort, a further improvement in a suspension system of wheels is under pressure.

SUMMARY OF THE INVENTION

Therefore, it is an object of this invention to provide a control device of the above type in which a variable damping force generating device in a damper is operatively connected to a wheel support arm to generate a damping force corresponding to a swung position thereof thereby giving occupants a better riding comfort.

In accordance with the present invention, in order to achieve the above-described object, an adjusting member capable of adjusting through axial or rotational displacement a damping force to be generated by a damping force generating device is provided on a damper, and the adjusting member and a wheel support arm are operatively connected so that the adjusting member is caused to produce certain axial displacement or rotational displacement in response to the swinging movement of the wheel support arm.

In the above construction of the invention, when the wheel support arm swings, the adjusting member is caused to produce an axial displacement or rotational displacement accordingly and the damping force generating device housed within the damper generates a damping force corresponding to the swung position of the wheel support arm. Thus a generated damping force of the damping force generating device is to be automatically controlled whereby the damper may exhibit an effective damping function within a restricted range of the wheel support arm, greatly contributing to improvements of a riding comfort.

The above and other objects, features and advantages of the present invention may be best understood by reference to the following description taken in conjunction with the accompanying drawings.

BRIEF DESCRIPTION OF THE DRAWINGS

FIG. 5 is a side view of a device according to a third embodiment of the invention and FIG. 5A is a view showing the operation thereof;

FIG. 7 is a side view of a device according to a fifth embodiment of the invention.

DESCRIPTION OF THE PREFERRED EMBODIMENTS

Figure 1:
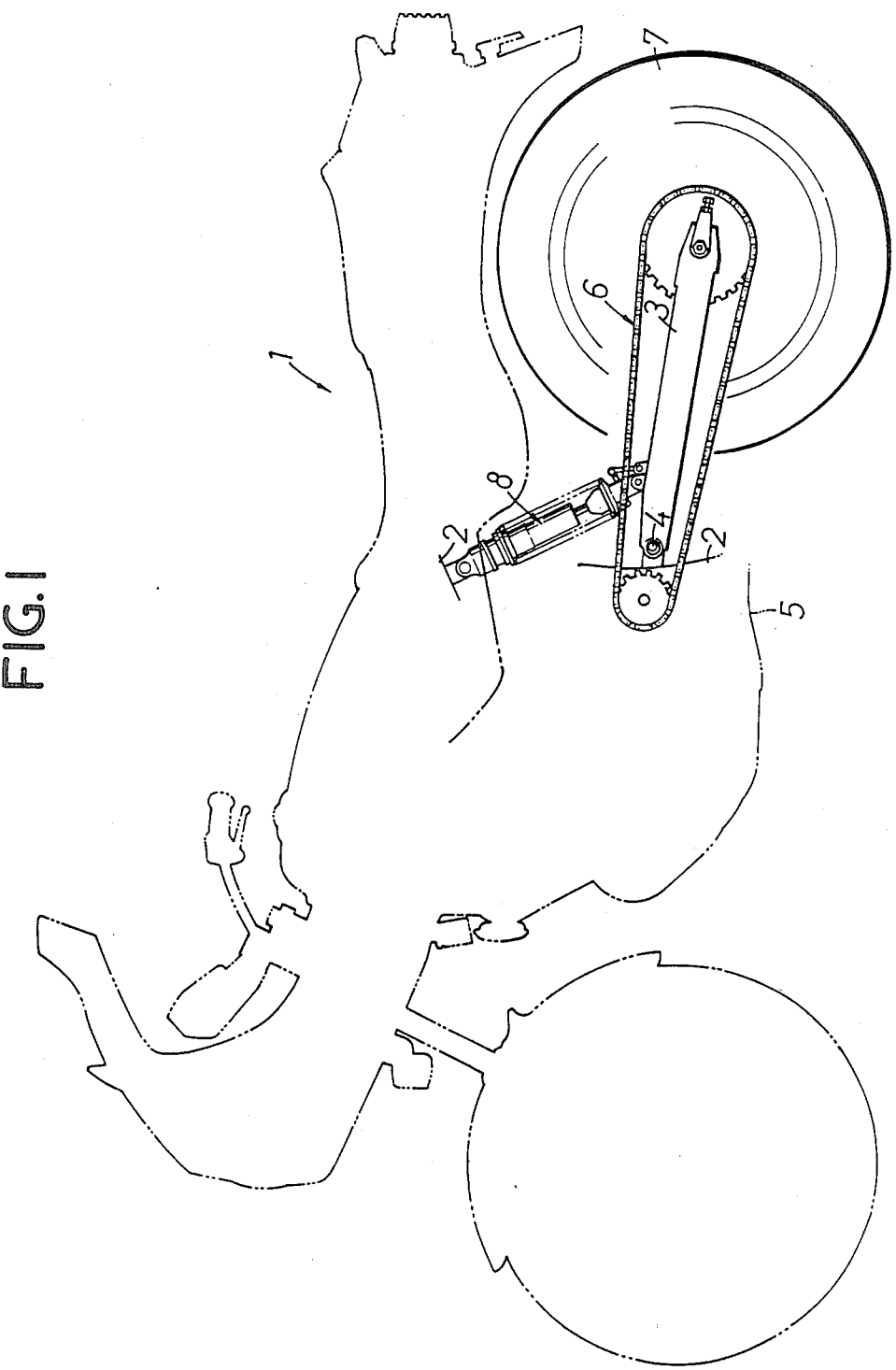
FIGS. 1 to 3 show a first embodiment of the present invention, FIG. 1 being a side view of a motorcycle in which a device according to the invention is applied to a suspension system for a rear wheel, FIG. 2 being a side view of the device according to the invention.

Several embodiments of the present invention will be described hereinafter with reference to the drawings. Throughout these embodiments, like reference numerals designate like or corresponding parts.

First embodiment of the invention will now be described. To the rear of a body 2 of a motorcycle 1, a rear fork 3 as a wheel support arm is connected at a pivot 4 swingingly up and down, and at the rear end of the rear fork 3 is supported a wheel or a rear wheel 7 driven by an engine 5 through a chain transmission device 6. (See FIG. 1.)

Figure 2:
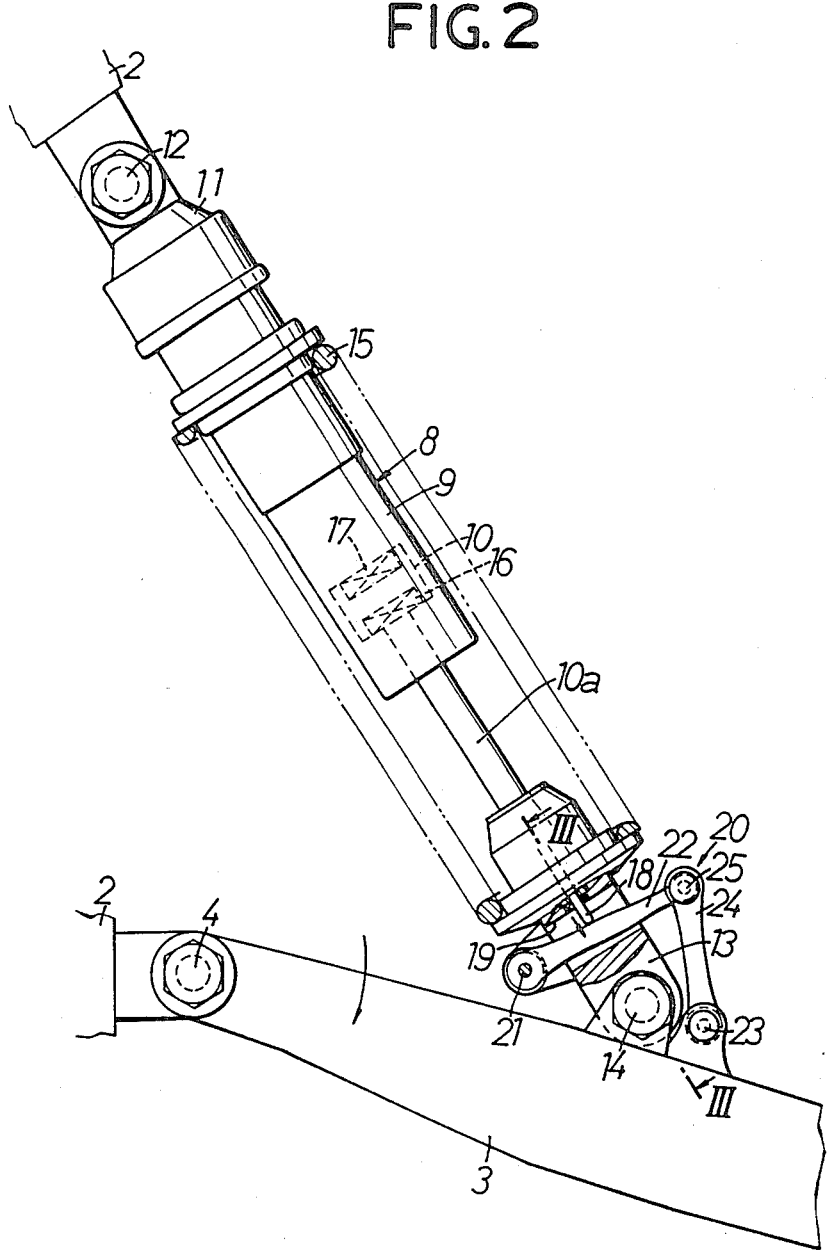

As shown in FIG. 2, a damper 8 is interposed between the body 2 and the rear fork 3. The damper 8 comprises a cylinder 9 sealingly filled therein with a damping oil and a piston 10 slidably fitted within the cylinder 9. An upper mounting member 11 fixedly mounted on the upper end of the cylinder 9 is connected swingingly back and forth to the body 2 through a pivot 12. A piston rod 10a slidably extends through the lower end wall of the cylinder 9 and is connected to the piston 10, and a lower mounting member 13 fixedly mounted on the lower end of the piston rod 10a is connected swingingly back and forth to the rear fork 3 through a pivot 14. Between the lower mounting member 13 and the cylinder 9 is compressed a coil-like suspension spring 15 for biasing the damper 8 in an expanding direction.

The piston 10 is provided with a known expansion damping force generating device 16 for applying a damping force to the expanding action of the damper 8 and a known contraction damping force generating device 17 for applying a damping force to the contracting action of the damper 8. To the expansion damping force generating device 16 is connected an adjusting member 18 capable of adjusting the generated damping force by making an axial displacement.

Figure 3:
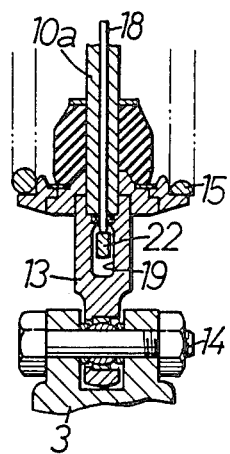

The adjusting member 18 is biased by means of a spring not shown so as to have its one end projected into a lateral hole 19 of the lower mounting member 13 while extending through the shaft center of the piston rod 10a. As the amount of projection of that end into the lateral hole 19 increases, a damping force generated by the expansion damping force generating device 16 may be increased. (See FIG. 3.)

Turning again to FIG. 2, the adjusting member 18 is operatively connected to the rear fork 3 through an interlocking device 20 so that the member 18 may be projected into the lateral hole 19 as the rear fork 3 swings downward. The interlocking device 20 comprises a first link 22 pivoted at 21 swingingly up and down on one side of the lower mounting member 13 and extending through the lateral hole 19 so as to be in operative connection with the adjusting member 18, and a second link 24 pivoted at 23 swingingly back and forth on the rear fork 3 and pivotally connected at 25 to the first link 22.

The operation of the first embodiment will be now described. When during running of the vehicle, the rear wheel 7 receives an upward load from the road surface, the rear fork 3 swings upwardly against the force of the suspension spring 15, then the damper 8 contracts. Therefore the damping force is generated by the contract damping force generating device 17 to thereby moderately control the upward swinging velocity of the rear fork 3.

Figure 2A:
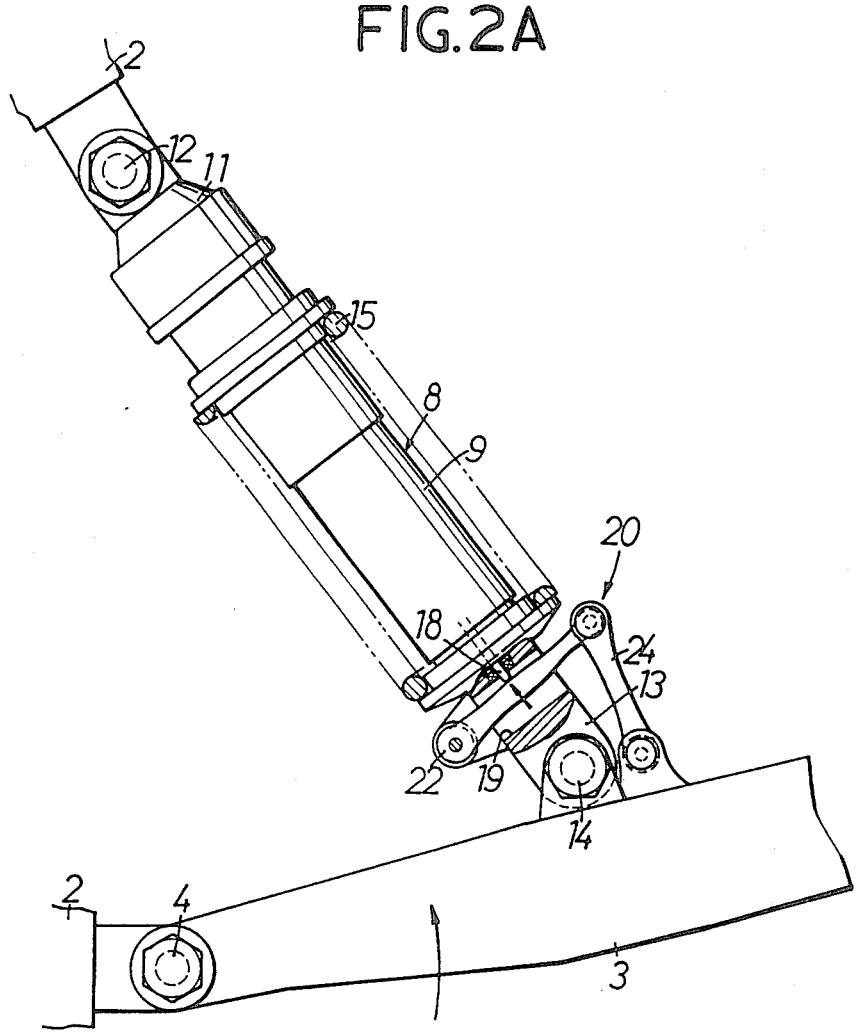
FIG. 2A being a view showing the operation thereof, FIG. 3 being a sectional view taken on line III—III of FIG. 2.

When the rear fork 3 swings upward, an angle formed between both axes of the rear fork 3 and damper 8 varies, namely, increases with the result that the first link 22 is swung upwardly around the pivot 21 by means of the second link 24 to urge the adjusting member 18 toward the piston rod 10a (see FIG. 2A).

Next, when the upward load applied to the rear wheel 7 is released and the rear fork 3 is swung downwardly by the force of the suspension spring 15, the damper 8 then expands and the first link 22 is swung downwardly around the pivot 21 to allow the adjusting member 18 to project into the lateral hole 19 (see FIG. 2). Therefore the damping force is generated by the expansion damping force generating device 16, and the damping force increases as the downward swinging amount of the rear fork 3 increases. Accordingly, the velocity of the downward swing of the rear fork 3 is strongly restricted as the swinging amount thereof increases whereby a great swinging energy of the rear fork 3 may be effectively absorbed without being accompanied by a great shock within the range of a predetermined swinging stroke of the rear fork 3.

Figure 4:
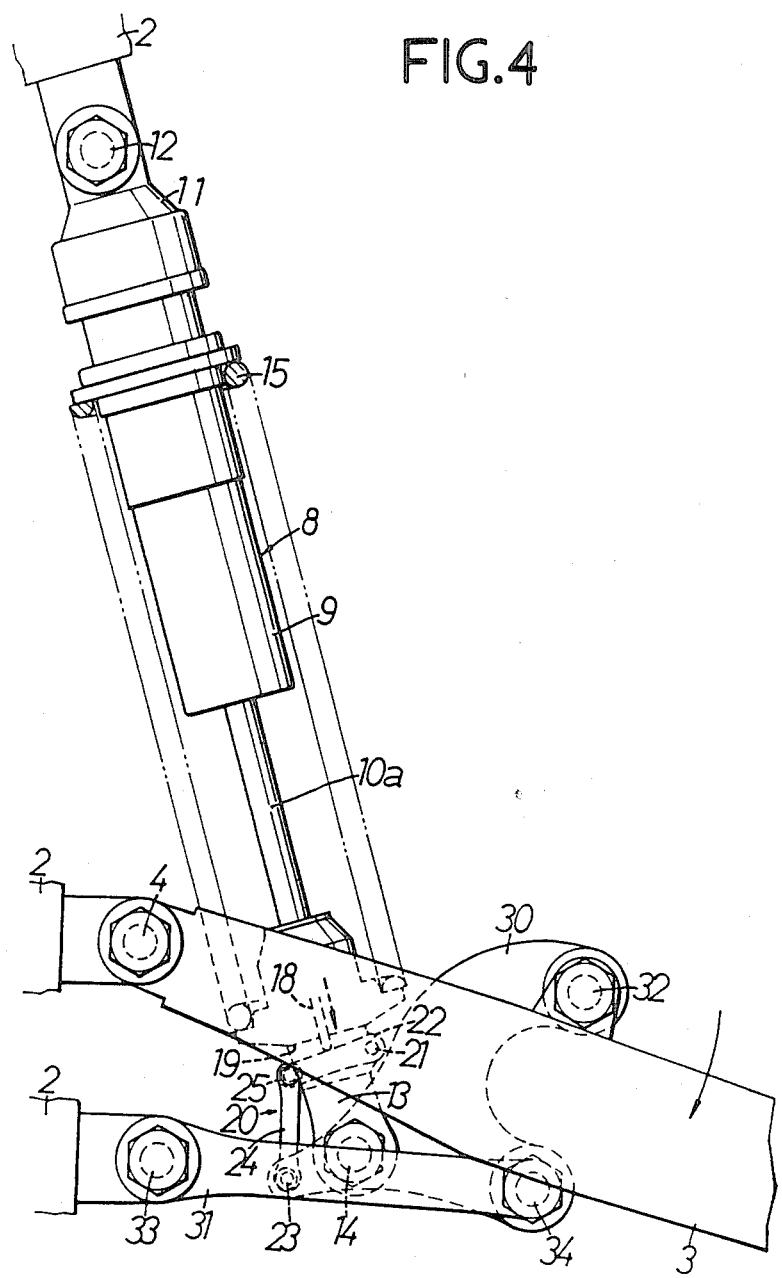
FIG. 4 is a side view of a device according to a second embodiment of the invention and FIG. 4A is a view showing the operation thereof.

FIG. 4 shows a second embodiment of the present invention, in which as the upward swinging amount of the rear fork 3 increases, the contracting amount of the damper 8 increases in an accelerating manner. More specifically, to the rear fork 3 is pivoted at 32 the rear end of a link 30 of basically triangular shape at an intermediate portion of the fork 3 for up and down swing motion. The front end of a tension rod 31 is pivoted at 33 to the body 2 at a position below the pivot 4 of the rear fork 3 so as to be swingable up and down. The rear end of the tension rod 31 and an intermediate portion of the link 30 are pivotally connected together at 34, and the lower mounting member 13 of the damper 8 is connected at a pivot 14 to the front end part of the link 30. Second link 24 of the interlocking device 20 is pivoted at 23 to the front end of the link 30. Other structures of the second embodiment are the same as those of the first embodiment.

Figure 4A:
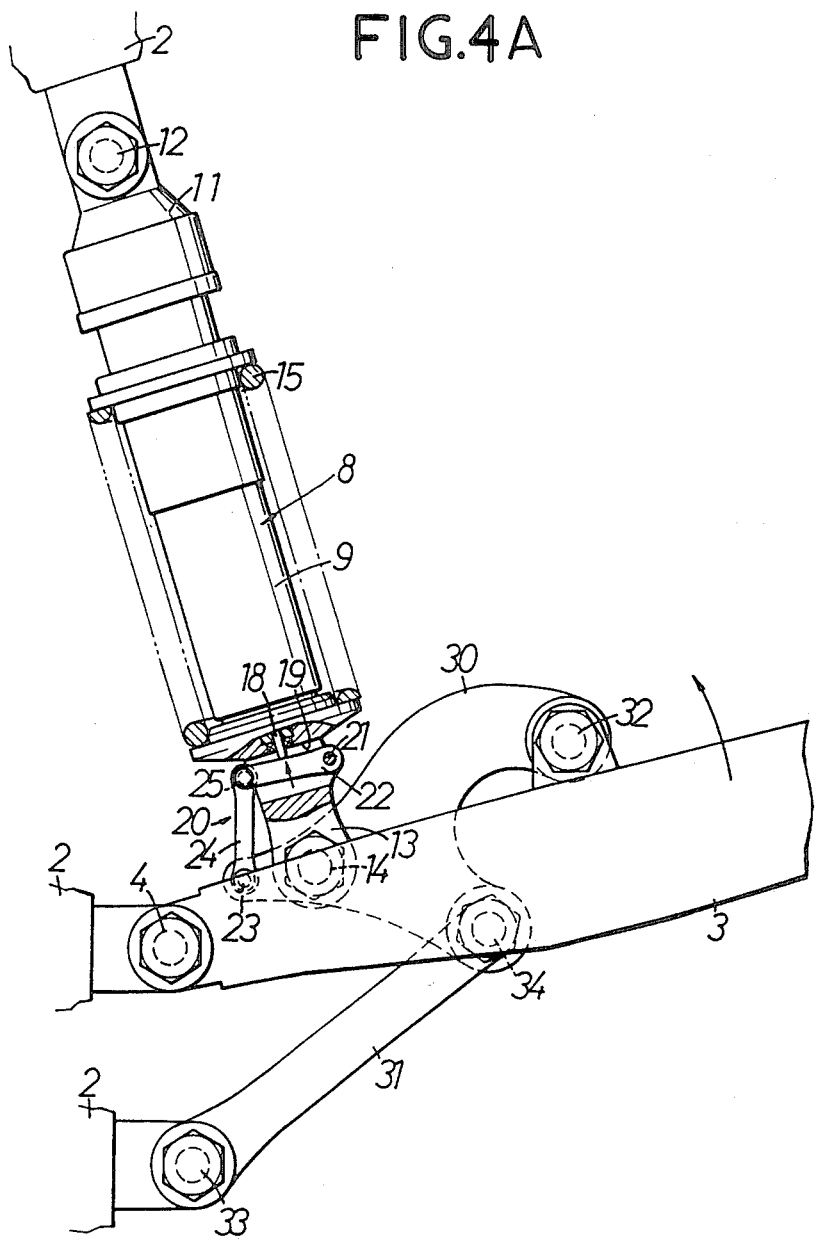

According to the second embodiment, as the rear fork 3 swings upward, the first link 22 of the interlocking device 20 is turned around the pivot 21 through the link 30. Therefore the adjusting member 18 in contact with the link 22 is forced to be moved upward as shown in FIG. 4A. On the other hand, when the rear fork 3 swings downward, the adjusting member 18 is moved downward under the action of the not-shown spring in synchronism with the turning of the first link 22. Thus the generated damping force of the expansion damping force generating device 16 is controlled to be increased and decreased by the adjusting member 18 according to the amount of swinging of the rear fork 3.

While in the above-described first and second embodiments, the adjusting member 18 is connected to the expansion damping force generating device 16 to control the generated damping force of the device 16, it is to be noted that also when the adjusting member 18 is connected to the contract damping force generating device 17, the device 17 may be of course controlled.

In the above-described embodiments, the generated damping force is adjusted by the axial displacement of the adjusting member 18, in case of a third embodiment which will be described later in conjunction with FIG. 5, the generated damping force of the expansion damping force generating device 16 is to be adjusted by the rotational displacement of an adjusting member 118.

The adjusting member 118 of the third embodiment is rotatably supported on a lower mounting member 113, and as it rotates counterclockwise in FIG. 5, a damping force to be generated by the expansion damping force generating device 16 is increased.

This adjusting member 118 is operatively connected to the rear fork 3 through an interlocking device 120 so that the member 118 is turned counterclockwise as the rear fork 3 swings downward. The interlocking device 120 comprises a first link 122 secured to the outer end of the adjusting member 118 and a second link 124 pivoted at 123 swingingly back and forth to the rear fork 3 and pivotally coupled at 125 to the first link 122.

The operation of this embodiment will be described hereinafter. When during the running of the vehicle, the rear wheel receives an upward load from the road surface, the rear fork 3 swings upwardly against the force of the suspension spring 15, then the damper 8 contracts. Therefore the damping force is generated by the contract damping force generating device 17 to thereby moderately control the upward swinging velocity of the rear fork 3.

When the rear fork 3 swings upward, an angle formed between both axes of the rear fork 3 and damper 8 varies, namely, increases with the result that the first link 122 is swung upwardly by means of the second link 124 to rotate the adjusting member 118 clockwise (see FIG. 5A).

When the upward load applied to the rear wheel is released and the rear fork 3 is swung downwardly by the force of the suspension spring 15, the damper 8 then expands and the first link 122 is turned downwardly to rotate the adjusting member 118 counterclockwise (see FIG. 5). Therefore the damping force is generated by the expansion damping force generating device 16, and the damping force increases as the downward swinging amount of the rear fork 3 increases. Accordingly, the downward swinging velocity of the rear fork 3 is more strongly restricted as the swinging amount thereof increases, whereby a great swinging energy of the rear fork 3 may be effectively absorbed without being accompanied by a great shock within the range of a predetermined swinging stroke of the rear fork 3.

Figure 6:
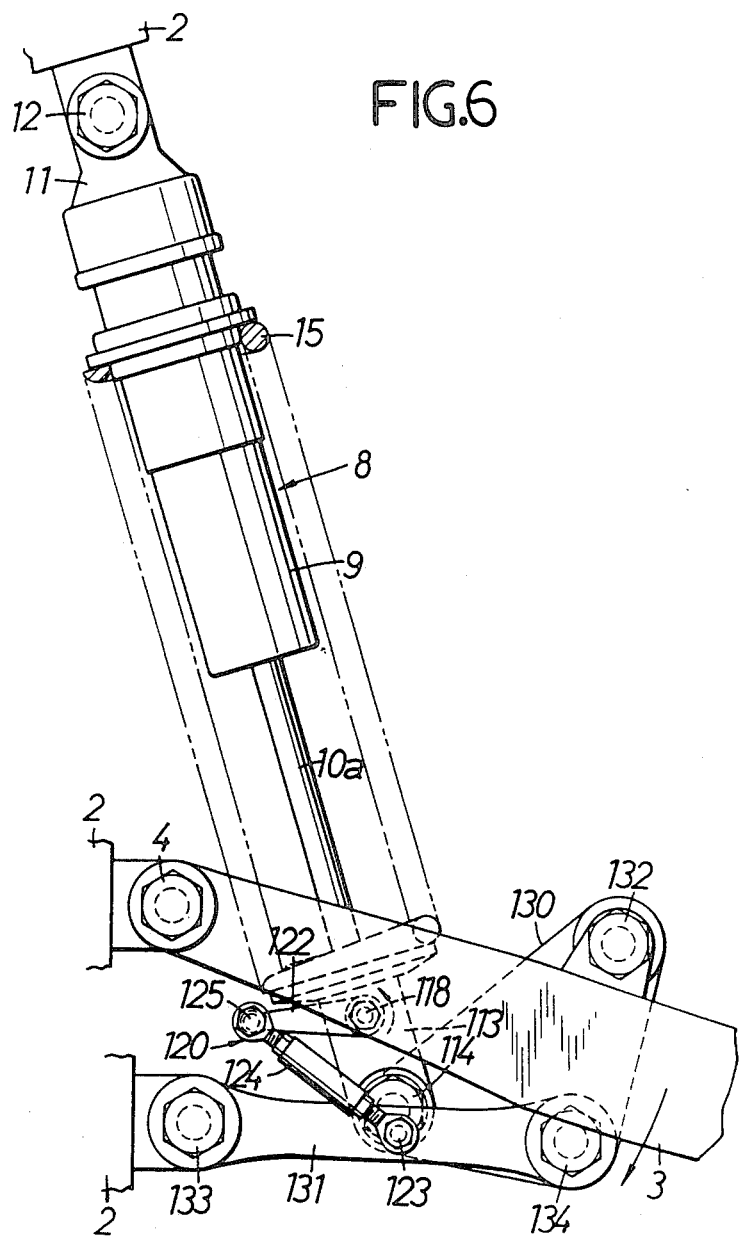
FIG. 6 is a side view of a device according to a fourth embodiment of the invention and FIG. 6A is a view showing the operation thereof.
Figure 6A:
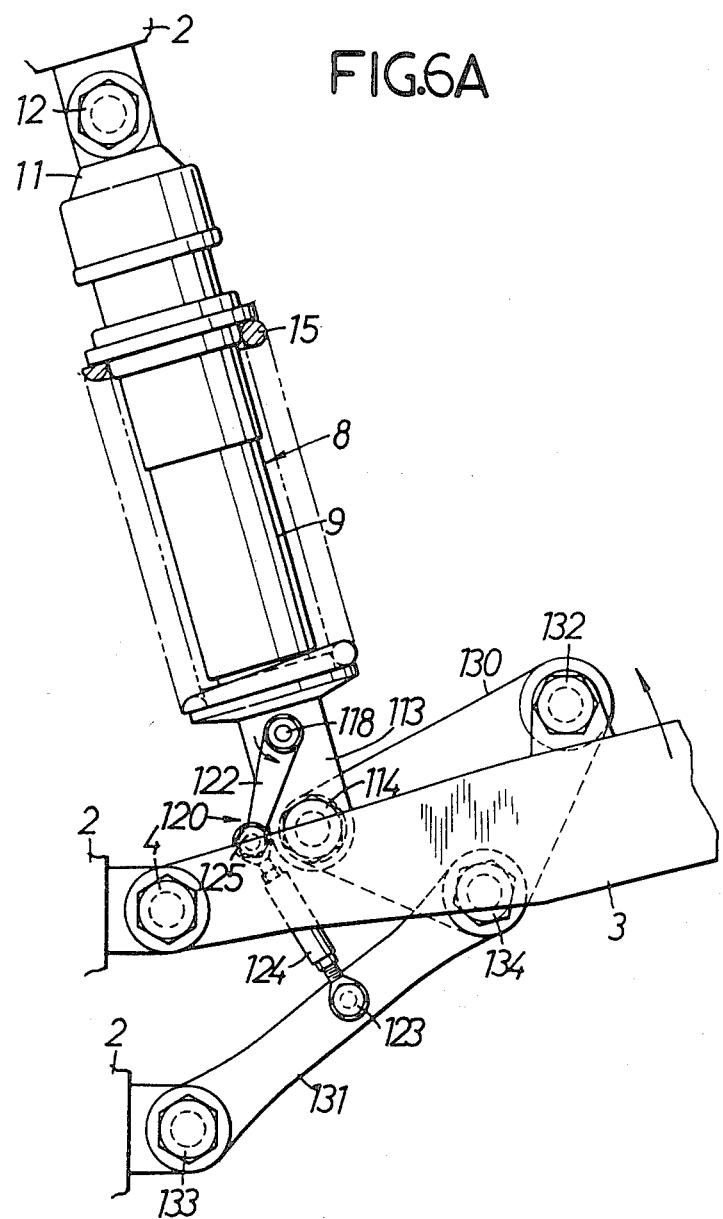

FIG. 6 shows a fourth embodiment of the present invention, in which as the upward swinging amount of the rear fork 3 increases, the contacting amount of the damper 8 increases in an accelerating manner. More specifically, to the rear fork 3 is connected via pivot 132 the rear end of a link 30 at an intermediate portion of the fork 3 for up and down swing motion. Front end of a tension rod 131 is pivoted at 133 to the body 2 at a position below the pivot 4 of the rear fork 3 so as to be swingable up and down. The rear end of the tension rod 131 and an intermediate portion of the link 130 are pivotally coupled together at 134, and a lower mounting member 113 of the damper 8 is connected at a pivot 114 to the front end of the link 130. Second link 124 of an interlocking device 120 is pivoted at 123 to an intermediate portion of the tension rod 131. Other structures of the fourth embodiment are the same as those of the third embodiment. FIG. 6A shows an operating state of the adjusting member 118 when the rear fork 3 has swung upward.

FIG. 7 shows a fifth embodiment of the present invention, which unlike the aforementioned first to fourth embodiments, controls the contract damping force generating device 17 of the damper 8. Its basic construction, however, corresponds to that of the fourth embodiment. In the fifth embodiment, the damper 8 is arranged upside-down reversely to the fourth embodiment. That is, the damper 8 is mounted with its piston rod 10a oriented upwardly between the body 2 and a second link 224, and an adjusting member 218 is operatively connected to the contract damping force generating device 17 in a manner that the damping force generated by the device 17 may be adjusted by the rotational displacement of the member 218. The adjusting member 218 is rotatably supported on a mounting member 211 of the cylinder 9, and as it rotates counterclockwise in FIG. 7, the generated damping force of the contract damping force generating device 17 is increased. This adjusting member 218 is operatively connected to the rear fork 3 through an interlocking device 220 so that the member 218 may be turned counterclockwise as the rear fork 3 swings upward.

When the rear fork 3 is swung upward by an upward load applied from the road surface onto the rear wheel, the adjusting member 218 is turned counterclockwise by the interlocking device 20. Therefore, as the upward swinging amount of the rear fork 3 increases, the damping force generated by the contract damping force generating device 17 of the damper 8 is controlled to be increased.

It will be obvious that the fifth embodiment would be modified so as to have its contract damping force generating device 17 controlled in generation of the damping force in response to the axial displacement of the adjusting member 218 as in the first and second embodiments.

What is claimed is:

1. A damping force control device for a vehicle damper, the damper being interposed between a vehicle body and a wheel support arm supported swingably up and down on the body to support a wheel, the damper being provided therein with a damping force generating device, wherein said control device includes an adjusting member provided on said damper and adapted to adjust a damping force which is to be generated by said damping force generating device through an axial displacement of the member, said adjusting member and said wheel support arm being operatively connected to each other such that said adjusting member makes an axial displacement in response to a swinging movement of said wheel support arm, and an interlocking device interposed between the adjusting member and the wheel support arm, said interlocking device being rotatable in accordance with the swinging movement of said wheel support arm thereby to transmit a rotating motion of the interlocking device to said adjusting member as an axial motion.

2. A damping force control device for a vehicle damper, the damper being interposed between a vehicle body and a wheel support arm supported swingably up and down on the body to support a wheel, the damper being provided therein with a damping force generating device, wherein said control device includes an adjusting member provided on said damper and adapted to adjust a damping force which is to be generated by said damping force generating device through a rotational displacement of the member, said adjusting member and said wheel support arm being operatively connected to each other such that said adjusting member makes a rotational displacement in response to a swinging movement of said wheel support arm.

3. The damping force control device according to claim 2, further comprising an interlocking device interposed between said adjusting member and said wheel support arm, said interlocking device being rotatable in accordance with the swinging movement of said wheel support arm thereby to transmit a rotating motion of the interlocking device to said adjusting member as a rotating motion.

4. The damping force control device according to claims 1, 2 or 3, wherein said damping force generating device comprises an expansion damping force generating device for generating a damping force when said damper operates to be expanded and a contract damping force generating device for generating a damping force when said damper operates to be contracted, said control device being associated with either one of the expansion and contract damping force generating devices.

* * * * *